United States Patent
Wagner (10) Patent No.: US 10,046,923 B2
(45) Date of Patent: Aug. 14, 2018

(54) DEVICE FOR DIVIDING OFF PACKAGING UNITS

(71) Applicant: KHS GmbH, Dortmund (DE)

(72) Inventor: Stefan Wagner, Xanten (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/896,446

(22) PCT Filed: Jun. 5, 2014

(86) PCT No.: PCT/EP2014/061675
§ 371 (c)(1),
(2) Date: Dec. 7, 2015

(87) PCT Pub. No.: WO2014/195398
PCT Pub. Date: Dec. 11, 2014

(65) Prior Publication Data
US 2016/0122134 A1    May 5, 2016

(30) Foreign Application Priority Data

Jun. 7, 2013  (DE) ........................ 10 2013 105 932

(51) Int. Cl.
| | |
|---|---|
| *B65G 47/26* | (2006.01) |
| *B65G 47/31* | (2006.01) |
| *B65B 21/06* | (2006.01) |
| *B65B 35/40* | (2006.01) |
| *B65B 59/00* | (2006.01) |
| *B65G 47/08* | (2006.01) |
| *B65G 47/28* | (2006.01) |
| *B65G 54/02* | (2006.01) |

(52) U.S. Cl.
CPC .............. *B65G 47/31* (2013.01); *B65B 21/06* (2013.01); *B65B 35/40* (2013.01); *B65B 59/005* (2013.01); *B65G 47/084* (2013.01); *B65G 47/28* (2013.01); *B65G 54/02* (2013.01)

(58) Field of Classification Search
CPC ........ B65G 47/28; B65G 47/31; B65B 21/06; B65B 35/40; B65B 59/005
USPC ................................ 198/419.2, 419.3, 418.7
See application file for complete search history.

(56) References Cited

U.S. PATENT DOCUMENTS

| | | | |
|---|---|---|---|
| 2,910,200 A | 10/1959 | Olson | |
| 3,731,715 A | 5/1973 | Gageant et al. | |
| 4,552,261 A * | 11/1985 | Raudat | .................. B65B 21/06 198/419.3 |
| 4,637,509 A | 1/1987 | Raudat et al. | |
| 4,769,580 A * | 9/1988 | Heidelberg | ........... B60L 15/005 104/292 |

(Continued)

FOREIGN PATENT DOCUMENTS

| | | |
|---|---|---|
| DE | 23 31 193 | 1/1975 |
| DE | 41 26 212 | 2/1993 |

(Continued)

*Primary Examiner* — William R Harp
(74) *Attorney, Agent, or Firm* — Occhiuti & Rohlicek LLP (57) ABSTRACT

An apparatus for separating packaging units to form product groups moving along a transport plane includes dividing elements that circulate on a linear transporter. Each dividing element has an engaging element that protrudes above the transport plane temporarily and then sinks back below the transport plane. A control cam controls the when and where the engaging element protrudes and sinks.

20 Claims, 6 Drawing Sheets

(56) References Cited

U.S. PATENT DOCUMENTS

| | | | |
|---|---|---|---|
| 7,726,464 B2 | 6/2010 | Cerf | |
| 7,815,034 B2 * | 10/2010 | Fleck | B65B 35/405 |
| | | | 198/418.7 |
| 8,096,409 B2 * | 1/2012 | Wipf | B65G 19/02 |
| | | | 198/728 |
| 8,720,673 B2 | 5/2014 | Loecht | |
| 9,346,576 B2 * | 5/2016 | Allgaier | B65B 35/00 |
| 2003/0098219 A1 * | 5/2003 | Mader | B65H 29/003 |
| | | | 198/678.1 |
| 2004/0112714 A1 | 6/2004 | Davaillon | |
| 2010/0140052 A1 * | 6/2010 | Martini | B65G 47/082 |
| | | | 198/419.2 |
| 2014/0138212 A1 * | 5/2014 | van de Loecht | B65G 47/31 |
| | | | 198/461.1 |

FOREIGN PATENT DOCUMENTS

| | | |
|---|---|---|
| DE | 10 2006 037 105 | 2/2008 |
| DE | 10 2008 040204 | 1/2010 |
| DE | 10 2009 029 314 | 8/2010 |
| DE | 10 2009 025 824 | 11/2010 |
| DE | 10 2009 044 271 | 4/2011 |
| DE | 10 2011 081 705 | 2/2013 |
| EP | 1 123 886 | 8/2001 |
| EP | 2 096 039 | 9/2009 |
| EP | 2 500 296 | 9/2012 |
| NL | 285 061 | 1/1965 |
| WO | WO 2008/022296 | 2/2008 |

* cited by examiner

DEVICE FOR DIVIDING OFF PACKAGING UNITS

RELATED APPLICATIONS

This application is the national stage under 35 USC 371 of international application PCT/EP2014/061675, filed on Jun. 5, 2014, which claims the benefit of the Jun. 7, 2013 priority date of German application DE 10 2013 105 932.5, the contents of which are herein incorporated by reference.

FIELD OF INVENTION

The invention relates to packaging, and in particular, to formation of packaging units.

BACKGROUND

In the packaging industry, it is often useful to bundle individual articles into groups of such articles. For example, when one buys bottled water at a supermarket, it can be purchased either one bottle at a time, or in shrink-wrapped units that contain a rectangular array of bottles. These arrays come in various sizes and shapes.

A difficulty that arises is that of forming these bundles from a stream of packaging units that move steadily along a conveying direction. In general, it is useful to speak of the rows and columns of a product group. The rows extend along the conveying direction, whereas the columns extend perpendicular to the conveying direction.

Forming the rows is fairly straightforward. One simply passes the packaging units through lane dividers to form single streams. However, forming the columns is more complicated. This complexity arises in part because the containers are moving all the time and must somehow be divided off from each other while they are moving.

SUMMARY

An object of the invention is to provide a device in which dividing segments are guided with simple means from beneath a transport plane up into the transport plane and back down below it.

In some embodiments of the invention, a plurality of movement elements each hold a dividing segment. The movement elements circulate on a linear transporter. The dividing segment comprises an engaging element and a guide element connected to the engaging element. As a guide element traverses a horizontally aligned path section of the linear transporter, the guide element traverses a control cam. When it does so, the control cam causes an engagement element of the dividing segment to be introduced through the transport plane and into a stream of packaging units.

An apparatus according to the invention achieves the object of introducing the dividing segments up into the transport plane from beneath it in a simple way. Only the control cam along which the dividing segments are guided is required for this purpose. To this extent the invention achieves a purely mechanical solution that obviates the need for costly electro-mechanical control complexity or extensive mechanical linkage arms. It also requires fewer dividing segments than known devices.

In some embodiments, the linear transporter is an electromagnetic direct drive on which movement elements, such as carriages, circulate. These movement elements are maneuvered, controlled, and regulated independently of one another. Ideally one or more engaging and/or guide elements are disposed on a top or side of each movement element.

In some embodiments, the control cam comprises a rising front section, a center section that runs horizontally relative to the transport plane, and an end section having, for example, a rounded profile. Such a front section guides the dividing segment so that the engaging element emerges from beneath the transport plane. The center section then takes over and guides the dividing element such that the engaging element remains at its vertical position above the transport plane. The rounded end section then allows the engagement element to again sink beneath the transport plane.

In some embodiments, the rising front section has a constant gradient, or slope.

In other embodiments, the center section immediately follows the front section.

In yet other embodiments, the rounded end section has a smaller axial extent along the conveying direction than both the center section and the front section. Among these embodiments are those in which the end section is a quadrant of a circle.

In other embodiments, the end section has a slope that increases the distance between the cam and the transport plane as a dividing segment proceeds along the conveying direction.

In yet other embodiments, the front section and the end section can have the same axial extent.

In some embodiments, the center section is rigid with a fixed, predetermined axial extent.

In further embodiments, the center section includes displaceable elements that can be displaced relative to each other. This permits continuous adjustment of the axial extent of the center section, and hence of the entire control cam, between a maximum extent and a minimum extent. Among these are embodiments in which the center section is telescopically adjustable, in which case the control surface is parallel to the transport plane. Also among the embodiments are those in which one element is rigid while the other is displaceable, and those in which two elements are displaceable.

In some embodiments, the center section's axial extent is parallel to the transport plane and greater than that of any foreseeable packaging unit with which the apparatus is to be used.

In other embodiments, the guide element is a roller. This permits the dividing segment, to which the roller attaches, to roll along the control cam. Some of these embodiments implement positive guidance of a roller. Among these are embodiments that have two flanges of the control cam between which the roller rolls.

In some embodiments, the dividing segment, or at least partial components of it, moves relative to the carrying movement element.

Other embodiments include those in which the dividing segment has a prismatic joint that is mounted on the movement element. The prismatic joint carries a carrier element that can move relative to the prismatic joint. Suitable carrier elements include angle elements that comprise a pin shank, on which is disposed the engaging element, and a roller shank, on which is disposed the guide element. The pin shank and roller shank extend parallel and square to the transport plane respectively. Suitable engaging elements and guide elements include an engaging pin and a roller respectively.

As the dividing segment, which is held on the movement element, rolls along the control cam, the inclination of the front section guides the engaging element upward so that it eventually engages the transport plane. As the movement element rolls along the center section, the engaging element remains in this engaged position. As it rolls along the end section, the engaging element again sinks below the transport plane.

In some embodiments, the dividing segment has an energy storage device, such as a spring element, or a coil spring. Stored energy in this energy storage device holds the carrier element in its lowest position. As the dividing segment moves along the front and middles sections of the control cam, the control cam forces the carrier element to deflect against the force exerted by the energy storage device. This continues until the dividing segment leaves the center section and crosses over into the end section.

The invention thus provides simple mechanical guidance of a dividing segment so that it can engage the transport plane in order to divide off future packaging units. In some embodiments, dividing segments accelerate a packaging unit, thus pushing it away from an accumulating product group.

In some embodiments, the linear transporter comprises a closed trajectory on which the individual movement elements circulate. The movement elements are individually controllable such that each movement element can have its own speed.

On an outward run of the trajectory, the speeds of the movement elements are unequal relative to one another even though all movement elements along the outward run have the same speed at the same point on the outward run. The outward run of the trajectory is associated with the control cam in such a way that the dividing segment is guidable along the control cam.

Along the return run, the movement elements can have different speeds. The movement elements can thus return along the return run quickly. This is beneficial because, as a result, only a very small number of movement elements is needed.

In some embodiments, the trajectory incorporates a gate to allow the removal of movement elements that are not needed or that must be serviced. The gate can also be used for introducing movement elements.

In other embodiments, the linear transporter is an electromagnetic track on which the movement elements circulate without needing gears. A suitable electromagnetic track incorporates an electromagnetic drive. A controller directly controls the movement elements via an interface along the trajectory. As a result, it is possible to individually control the speed of any particular movement element.

Embodiments include those with curved regions between the outward run and the return run. The trajectory can thus be individually configured so that its course adapts to suit requirements of the device for producing product groups from packaging units.

Unlike the approaches known from the prior art, engagement elements emerge into the transport plane only when the dividing segment is traversing the control cam. This avoids emergence in other regions of the linear transporter, and in particular, along a circular path. Emergence along a circular path complicates speed adjustment since one must then use trigonometric functions, such as the sine or cosine functions to properly adjust speed.

In operation, when the engaging element penetrates the transport plane, the movement element travels synchronously with the packaging units until the engaging element has fully emerged and the product group that is to be divided off has been achieved. The movement element's speed then changes to create a gap from the divided-off product group. The speed is selected so that the engaging element avoids contact with a product group moving ahead of it. By this time, a following dividing segment will have moved with a corresponding speed so that when the engaging element penetrates the transport plane the corresponding gap is found again in the product group.

In the case of a version with shorter product group lengths, it may be necessary to have additional movement elements in use on the track so as to reduce absolute track speeds.

In some embodiments, a cross-member on top of or on the side of a movement element can have a plurality of engaging elements. When raised, the engaging elements plunge into the packaging unit streams of neighboring rows or lanes, which can then all be simultaneously divided off and/or compacted with just the one movement element having to be moved.

Using one movement element per dividing segment allows such a system to be used even with short product lengths. By comparison, the shortest product length that is to be divided off is significantly greater when using two movement elements in conjunction with a parallelogram mechanism.

In one aspect, the invention features an apparatus for forming product groups from packaging units moving in single-track streams along a transport plane. Such an apparatus includes a dividing and/or compacting unit for separating packaging units moving along the transport plane. The dividing and/or compacting unit has a linear transporter, a control cam, and movement elements that circulate on the linear transporter. Each movement element has a dividing element that has an engaging element mounted on a top or side thereof and a guide element that connects to the engaging element. During circulation of the dividing segment along the linear transporter, the first guide element is guided along the control cam during a control interval during which the control cam controls vertical movement of the first engaging element. As a result of such control, the first engaging element moves from below the transport plane to above the transport plane, and then moves from above the transport plane to below the transport plane. The control cam controls first and second location at which the engaging element crosses the transport plane.

In some embodiments, the linear transporter includes an electromagnetic direct drive, and the movement elements are controlled independently of each other while circulating on the linear transporter.

In some embodiments, the control cam includes a leading control surface that a dividing element encounters first during operation, a central control surface, and a trailing control surface. The leading control surface defines a slope that causes the first engaging element to move toward the transport plane. The central control surface extends parallel to the transport plane. As a result, he central control surface causes the first engaging element to maintain a vertical position thereof. Meanwhile, the trailing control surface defines a slope that causes the first engaging element to move away from the transport plane. Among these embodiments are those in which an axial extent of the trailing control surface is less than that of the first control surface. Also among these embodiments are those in which the leading and trailing control surfaces have the same axial extent, either of which are less than that of the central control surface.

In some embodiments, the control cam is adjustable.

In other embodiments, the guide element includes a roller.

In yet other embodiments, the engaging element includes an engaging pin. Among these are embodiments in which the first dividing element further including a pin shank and a roller shank, and the engaging pin is arranged on the pin shank, while the guide element is arranged on the roller shank.

In some embodiments, the first dividing segment includes a carrier element having a pin shank parallel to the transport plane and a roller shank perpendicular to the transport plane. Among these are embodiments that also have a first dividing segment further includes a prismatic joint coupled to the carrier element.

As used herein, "packaging units" include containers, such as bottles, cans, tubes, and pouches, whether made from metal, glass and/or plastic, including PET bottles, as well as other packaging elements, in particular, those that are suitable for the filling of liquid or viscous products, for holding foods, including granulated foods, and containers that have already been combined into groups, or multi-packs.

Further embodiments, advantages, and possible applications of the invention arise out of the following description of embodiments. All of the described attributes whether alone or in any desired combination are fundamentally the subject matter of the invention independently of their synopsis in the claims or a retroactive application thereof. The content of the claims is also made an integral part of the description.

BRIEF DESCRIPTION OF THE FIGURES

These and other features of the invention will be apparent from the following detailed description and the accompanying claims, in which:

In the different figures, the same reference character identifies the same type of part. Such parts are therefore generally described only once.

DETAILED DESCRIPTION

In a typical packaging machine, a line divider divides packaging units 2 from a broad packaging-unit stream into a plurality of single-track packaging-unit streams. These streams then proceed to a dividing-off device 1, shown in FIG. 1, for separating and grouping packaging units 2 to form product groups 3 of packaging units 2.

Figure 1:
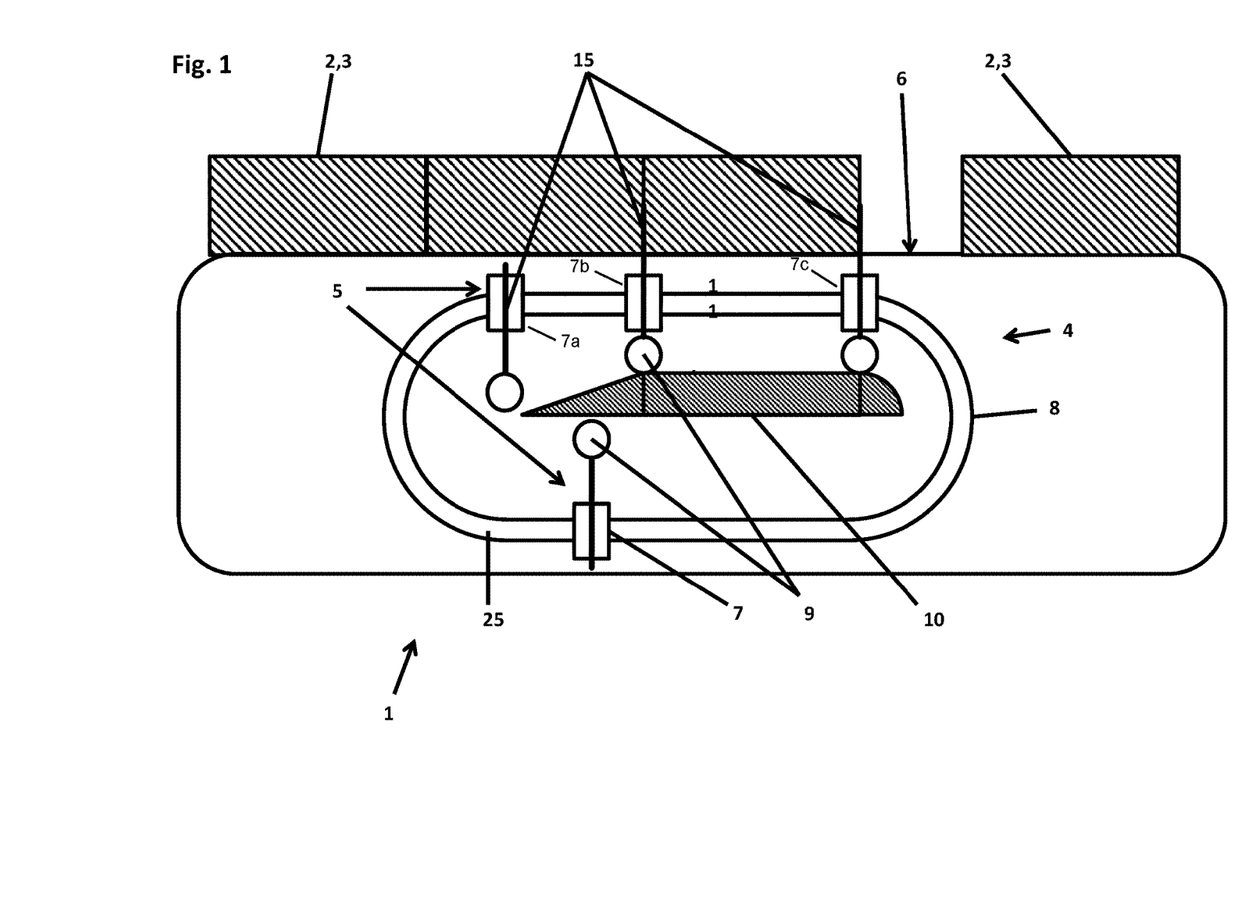
FIG. 1 shows a schematic view of a device for separating packaging units to form product groups.
Figure 2:
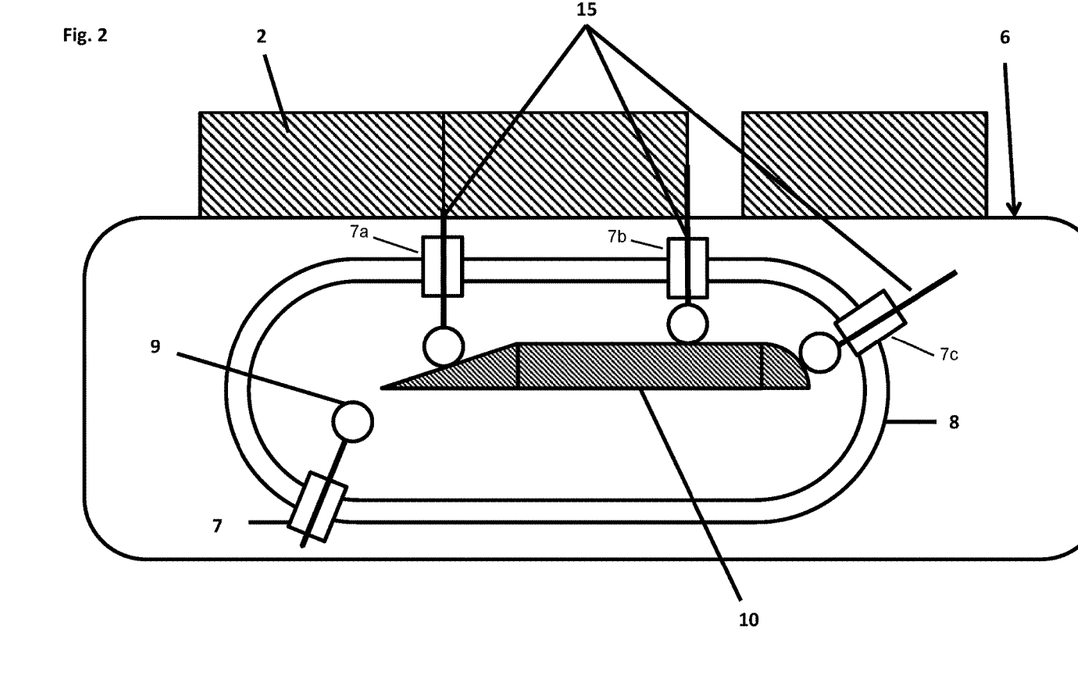
FIG. 2 shows the device of FIG. 1, with a sequence being discernible compared to FIG. 1.

The dividing-off device 1 features a dividing and/or compacting unit 4 that forms compacted or arranged product groups 3 by dividing off and compacting a predetermined number of packaging units 2 to form a subsequent product group 3. In doing so, the dividing and/or compacting unit 4 relies in part on dividing segments 5 that carry engaging units 15. These engaging units 15 rise up from beneath a transport plane 6 to engage packaging units 2 or product groups 3 that are on the transport plane 6. After having done their work, the engaging units 15 sink beneath transport plane 6.

The device includes a plurality of movement elements 7, each of which holds a corresponding one of the dividing segments 5. The movement elements 7 circulate along a closed trajectory 25 on a linear transporter 8.

Figure 7:
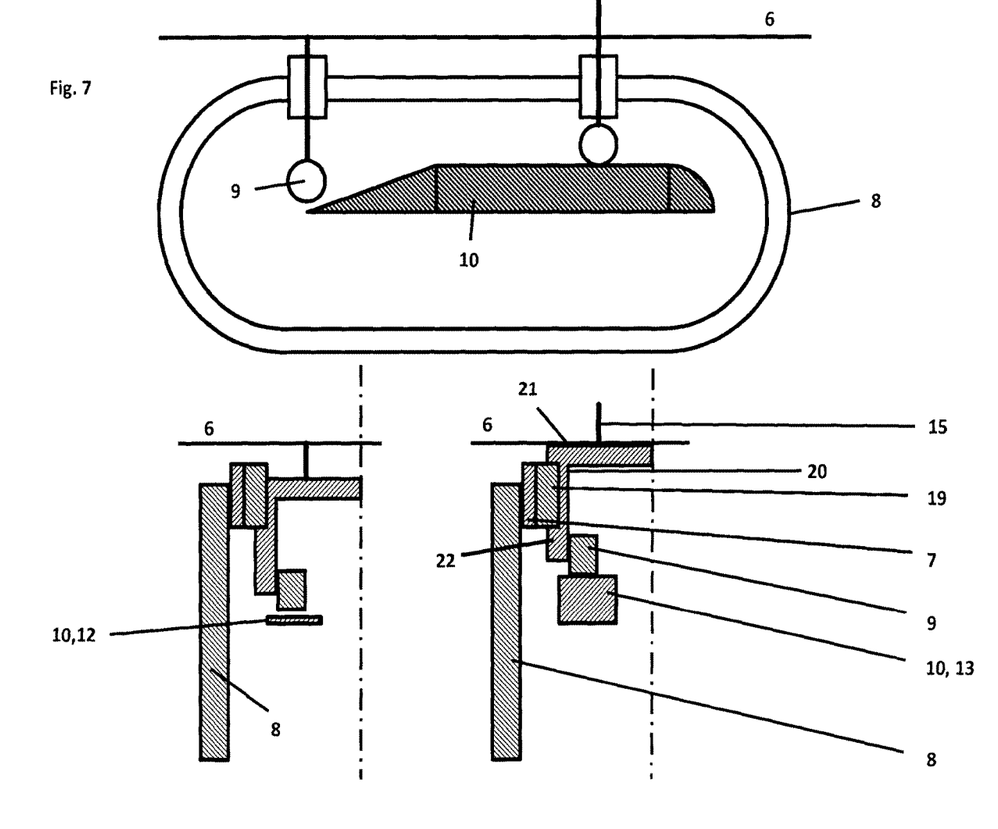
FIG. 7 shows a dividing segment in detail.

As alluded to above, and as shown in detail in FIG. 7, each dividing segment 5 includes an engaging element 15 and a guide element 9 connected to the engaging element 15. In some embodiments, the engaging element 15 is a pin and the guide element 9 is a roller.

As the movement elements 7 circulate on the trajectory 25 around the linear transporter 8, the guide elements 9 traverse a control cam 10. In those cases where the guide elements 9 are rollers, the guide elements 9 can simply roll along a control side 18 of the control cam 10. In either case, it is this control cam 10 that causes the engaging element 15 to rise up and then sink below the transport plane 6.

As shown in FIG. 1, the trajectory 25 includes an active section that lies between the control cam 10 and the transport plane 6. As a guide element 9 traverses this active section, it rolls over different sections of the control cam 10. The profile of the control cam 10 thus controls the vertical position of the engaging element 15.

Figure 4:
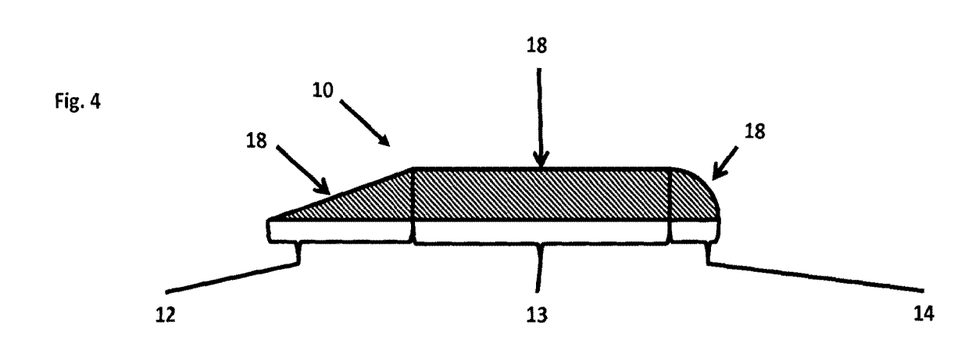
FIG. 4 shows a control cam that is not adjustable.
Figure 5:
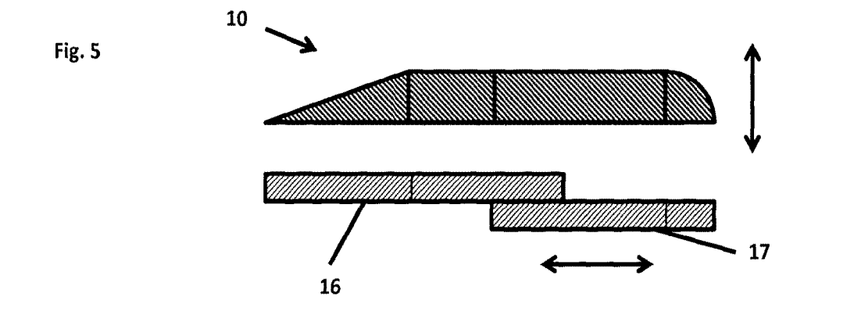
FIG. 5 shows an adjustable control cam.

According to the embodiment of FIG. 1 and of FIGS. 4 and 5, the control cam 10 includes three control surfaces: a leading control surface 12 having a constant slope that rises towards the transport plane 6, a central control surface 13 that is horizontal relative to the transport plane 6, and a rounded trailing control surface 14 that falls away from the transport plane 6.

As a particular dividing segment 5 traverses the rising leading control surface 12, the cam 10 pushes its engaging element 15 upwards so that it protrudes through the transport plane 6. This causes the engaging element 15 to plunge vertically into the packaging-unit stream rather than swinging into the packaging-unit stream.

The cam's level central control surface 13 immediately follows the leading control surface 12. As the dividing segment 5 traverses the cam's central control surface 13, the engagement element 15 continues to protrude above the transport plane 6. As the dividing segment 5 reaches the cam's rounded trailing control surface 14, the engaging element 15 moves downward until it is, once again, beneath transport plane 6.

Figure 6:
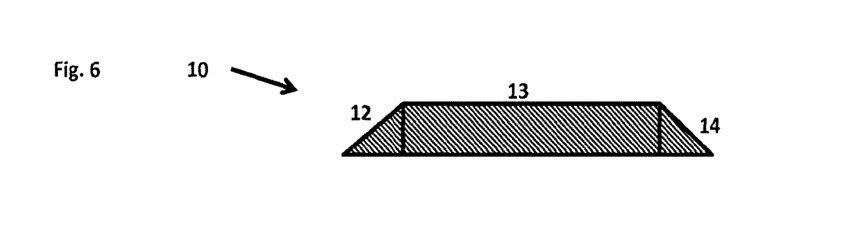
FIG. 6 shows a control cam with symmetric leading and trailing control surfaces.

The leading control surface 12, the central control surface 13, and the trailing control surface 14 all have different axial extents. In the illustrated embodiment, the axial extent of the trailing control surface 14 is the smallest of the three, and the axial extent of the central control surface 13 is the largest of the three. In the illustrated embodiment, the axial extent of the trailing control surface 14 is short enough so that the trailing control surface 14 is essentially a quadrant of a circle. However, in alternative embodiments, the trailing control surface 14 can be a ramp much like the leading control surface 12. In an exemplary embodiment of this type, shown in FIG. 6, the leading control surface 12 and the trailing control surface 14 have the same axial extent.

In some embodiments, the central control surface 13 has a fixed, axial extent. However, in other embodiments, the central control surface 13 comprises first and second displaceable elements 16, 17, as shown in FIG. 5. As a result, the axial extent of the central control surface 13, and of the control cam 10 as a whole, is continuously adjustable between a maximum extent and a minimum extent. In some embodiments, a motor moves the first and second displaceable elements 16, 17.

In other embodiments, such as that shown in FIG. 4, the central control surface 13 is telescopically adjustable. In this embodiment, the control side 18 of the cam 10 has a section parallel to the transport plane 6. At sections along the leading control surface 12 and the trailing control surface 14, the control side 18 conforms to the respective profiles of the leading control surface 12 and the trailing control surface 14.

Figure 8:
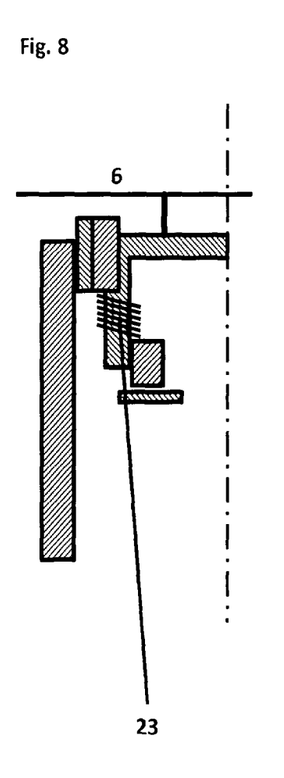
FIG. 8 shows a dividing segment similar to that shown in FIG. 7 but with an energy storage device.
Figure 9:
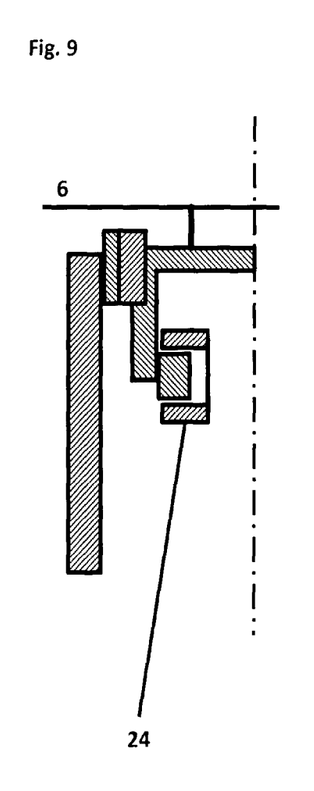
FIG. 9 shows a dividing segment similar to that shown in FIG. 7 but an enclosed guide roller.

When configured as a roller, the guide element 9 rolls on the control cam 10, as shown in FIG. 8. Alternatively, the control cam 10 can have two flanges 24 that enclose the guide element 9, as shown in FIG. 9. In that case, the guide element 9 rolls between the two flanges 24.

The double arrows also suggest the mobility of the control cam 10, which should be provided for a horizontal, i.e. format-part-dependent, definition of the motion of engaging element 15, in particular for all embodiments. In individual cases it may be an advantage to also vary the engagement height of the engaging elements 15, for example so as to come into contact with a certain packaging-unit region after they emerge. The execution of this operation can be manual or motorized.

The upper portion of FIG. 7 shows first and second dividing segments 5 along the control cam 10, with the first being to the left of the second. At the instant shown in FIG. 7, the first dividing segment 5 is in the midst of climbing the cam's leading control surface 12. The second dividing segment 5 is rolling along its central control surface 13 and approaching its trailing control surface 14. As depicted in FIG. 7, the various components of a dividing segment 5 move relative to the movement element 7.

The lower portion of FIG. 7 shows the dividing segment 5 in sufficient detail to see a prismatic joint 19 mounted on the movement element 7. The prismatic joint 19 carries a carrier element 20 that can move relative to the prismatic joint 19. In the particular embodiment shown, the carrier element 20 is configured as an angle element comprising a pin shank 21 and a roller shank 22. The pin shank 21 extends parallel to the transport plane 6. The roller shank 22, which is also connected to the prismatic joint 19, extends perpendicular to the transport plane 6. The engaging element 15, which in the illustrated embodiment is a pin, extends from the pin shank 21. The guide element 9, which in the illustrated embodiment is a roller, is arranged on the roller shank 22.

In the embodiment shown in FIG. 8, the dividing segment 5 includes an energy storage device 23 that uses its stored energy to hold the carrier element 20 in its lowest position. A suitable energy storage device 23 is a spring, such as a coil spring. As the dividing segment 5 traverses it, the control cam 10 deflects the carrier element 20 against the force of the energy storage device 23. This constrains the carrier element 20 until it leaves the central control surface 13.

In some embodiments, the linear transporter 8 defines a closed trajectory 23 on which circulating individual movement elements 7 are arranged. These circulating movement elements 7 are individually controllable. As a result, each movement element 7 can move at its own speed.

In some embodiments, the linear transporter 8 is an electromagnetic track on which directly controlled movement elements 7 circulate along the trajectory 25 without the use of gears. Such a linear transporter 8 can be an electromagnetic direct drive. As a result of this direct control over each movement element 7, any movement element 7 can be made to move at any speed. Each movement element 7 thus includes an interface with a controller to receive control instructions.

FIG. 1 shows first, second, and third movement elements 7a, 7b, 7c in various stages of operation.

The first movement element 7a has not yet had its engagement element 15 rise up above the transport plane 6 to engage a product. As the first movement element 7a climbs the control cam's leading control surface 12, it is accelerated to the speed of the product stream.

The second movement element trailing control surface 14, now moving at the speed of the product stream, has just had its engaging element 15 moved up by the control cam 10 so that it is between first and second packaging units 2. The second movement element 7b can then be made to decelerate, thus opening a gap between the first and second packaging units 2 similar to the gap that exists just in front of the third engaging element 7c.

The third engaging element 7c, having done its job, is ready to have its engaging element 15 retracted. It is thus made to accelerate so that it leaves behind the packaging unit 2 that it previously stood in front of. As shown in the figure, the control cam's trailing edge 14 slopes downward rapidly at this point so that the engaging element 15 can retract before hitting the packaging unit across the gap.

Figure 3:
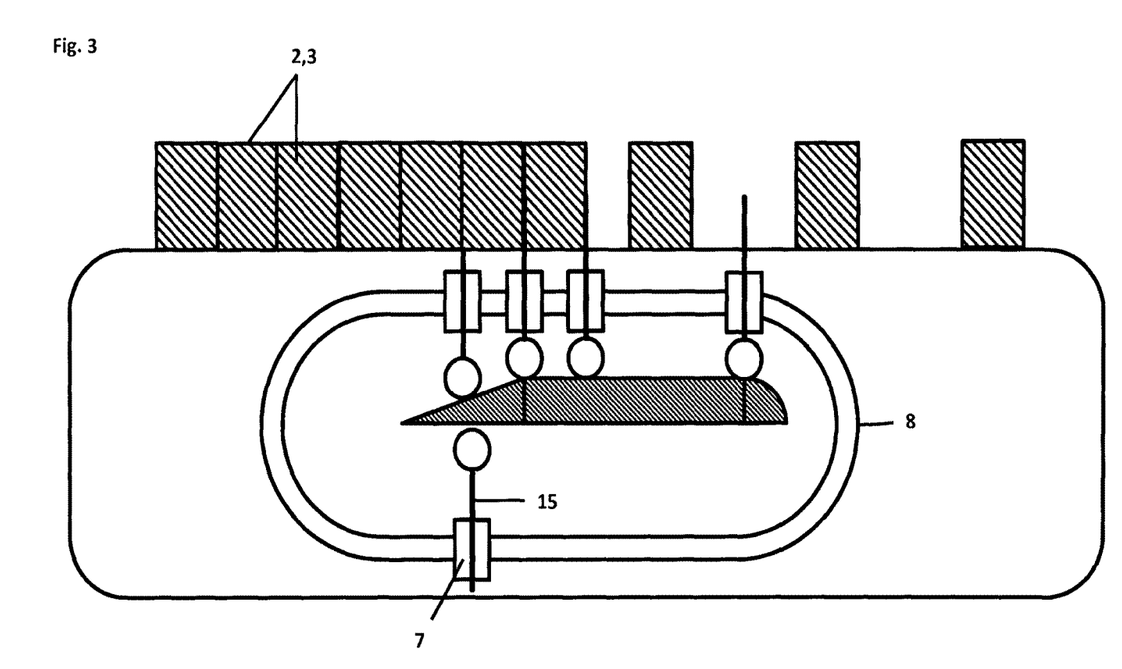
FIG. 3 shows the device of FIG. 1 configured to work with packaging units that are smaller than those in FIG. 1.

In the case of a version with shorter packaging units 2, as shown in FIG. 3, it may be necessary to have additional movement elements 7 in use on the track.

All embodiments are provided with one or more control and regulating units and, if necessary, optical or other sensor units. These cooperate to optimally and dynamically match the movement of the movement elements 7 and the point or region of the transport plane 6 at which engaging elements 15 emerge to conform to the observed transport motion of the packaging units 2.

All embodiments with their respective particularities can be combined as the transport task and the available space require.

Having described the invention, and a preferred embodiment thereof, what is claimed as new, and secured by Letters Patent is:

1. An apparatus for forming product groups from packaging units moving in single-track streams along a transport plane, said apparatus comprising a unit for separating packaging units moving along said transport plane, said unit comprising a linear transporter, a control cam, a plurality of movement elements, a plurality of dividing segments, a plurality of engaging elements, and a plurality of guide elements, wherein said movement elements circulate on said linear transporter, wherein said movement elements comprise a first movement element that holds a first dividing segment from said plurality of dividing segments, wherein said first dividing segment comprises a first engaging element selected from said plurality of engaging elements, wherein said first engaging element is mounted on one of a top and a side of said first dividing segment, wherein a first guide element from said plurality of guide elements connects to said first engaging element, wherein, during circulation of said first dividing segment along on said linear transporter, said first guide element is guided along said control cam during a control interval, wherein, during said control interval, said control cam controls vertical movement of said first engaging element, wherein, as a result of control by said control cam, said first engaging element moves from below said transport plane to above said transport plane, and then moves from above said transport plane to below said transport plane, wherein said control cam controls first and second locations at which said engaging element crosses said transport plane, and wherein said control cam is adjustable.

2. The apparatus of claim 1, wherein said linear transporter comprises an electromagnetic direct drive, and wherein said movement elements are controlled independently of each other while circulating on said linear transporter.

3. The apparatus of claim 1, wherein said control cam comprises first and second displaceable elements, wherein an axial extent of said cam changes as said first and second displaceable elements are displaced.

4. The apparatus of claim 3, further comprising a motor connected to move said first and second displaceable elements relative to each other.

5. The apparatus of claim 1, wherein said control cam comprises first and second displaceable elements, wherein said control cam is configured to transition between a first length and a second length, wherein, when said control cam has said first length, said first displaceable element extends into said second displaceable element by a first amount, wherein, when said control cam has said second length, said first displaceable element extends into said second displaceable element by a second amount, and wherein a difference between said first and second lengths is equal to a difference between said first and second amounts.

6. The apparatus of claim 1, wherein said linear transporter is configured to accelerate a moving first movement element towards a moving second movement element, thereby closing a gap between said first and second movement elements.

7. The apparatus of claim 1, wherein said control cam comprises a leading control-surface, a central control-surface, and a trailing control-surface, wherein, in operation, said first dividing element encounters said leading control-surface before said central control-surface, wherein said leading control-surface defines a slope that causes said first engaging element to move toward said transport plane, wherein said central control-surface extends parallel to said transport plane, as a result of which said central control-surface causes said first engaging element to maintain a vertical position thereof, and wherein said trailing control-surface defines a slope that causes said first engaging element to move away from said transport plane.

8. An apparatus for forming product groups from packaging units moving in single-track streams along a transport plane, said apparatus comprising a unit for separating packaging units moving along said transport plane, said unit comprising a linear transporter, a control cam, a plurality of movement elements, a plurality of dividing segments, a plurality of engaging elements, and a plurality of guide elements, wherein said movement elements circulate on said linear transporter, wherein said movement elements comprise a first movement element that holds a first dividing segment from said plurality of dividing segments, wherein said first dividing segment comprises a first engaging element selected from said plurality of engaging elements, wherein said first engaging element is mounted on one of a top and a side of said first dividing segment, wherein a first guide element from said plurality of guide elements connects to said first engaging element, wherein, during circulation of said first dividing segment along on said linear transporter, said first guide element is guided along said control cam during a control interval, wherein, during said control interval, said control cam controls vertical movement of said first engaging element, wherein, as a result of control by said control cam, said first engaging element moves from below said transport plane to above said transport plane, and then moves from above said transport plane to below said transport plane, wherein said control cam controls first and second locations at which said engaging element crosses said transport plane, and said first guide element comprises a roller.

9. The apparatus of claim 8, wherein said control cam comprises a leading control-surface, a central control-surface, and a trailing control-surface, wherein, in operation, said first dividing element encounters said leading control-surface before said central control-surface, wherein said leading control-surface defines a slope that causes said first engaging element to move toward said transport plane, wherein said central control-surface extends parallel to said transport plane, as a result of which said central control-surface causes said first engaging element to maintain a vertical position thereof, and wherein said trailing control-surface defines a slope that causes said first engaging element to move away from said transport plane.

10. The apparatus of claim 8, wherein said first engaging element comprises an engaging pin.

11. The apparatus of claim 10 wherein said first dividing element further comprising a pin shank and a roller shank, wherein said engaging pin is arranged on said pin shank, and wherein said guide element is arranged on said roller shank.

12. The apparatus of claim 8, wherein said control cam comprises a leading control-surface, a central control-surface, and a trailing control-surface, and wherein said trailing control-surface defines a quadrant of a circle.

13. The apparatus of claim 8, wherein said control cam comprises first and second flanges between which said guide element travels.

14. The apparatus of claim 8, wherein said linear transporter is configured to accelerate a moving first movement element towards a moving second movement element, thereby closing a gap between said first and second movement elements.

15. An apparatus for forming product groups from packaging units moving in single-track streams along a transport plane, said apparatus comprising a unit for separating packaging units moving along said transport plane, said unit comprising a linear transporter, a control cam, a plurality of movement elements, a plurality of dividing segments, a plurality of engaging elements, and a plurality of guide elements, wherein said movement elements circulate on said linear transporter, wherein said movement elements comprise a first movement element that holds a first dividing segment from said plurality of dividing segments, wherein said first dividing segment comprises a first engaging element selected from said plurality of engaging elements, wherein said first engaging element is mounted on one of a top and a side of said first dividing segment, wherein a first guide element from said plurality of guide elements connects to said first engaging element, wherein, during circulation of said first dividing segment along on said linear transporter, said first guide element is guided along said control cam during a control interval, wherein, during said control interval, said control cam controls vertical movement of said first engaging element, wherein, as a result of control by said control cam, said first engaging element moves from below said transport plane to above said transport plane, and then moves from above said transport plane to below said transport plane, wherein said control cam controls first and second locations at which said engaging element crosses said transport plane, and wherein said carrier element comprises a pin shank parallel to said transport plane and a roller shank perpendicular to said transport plane.

16. The apparatus of claim 15, wherein said first dividing segment further comprises a prismatic joint, and wherein said carrier element is coupled to said prismatic joint.

17. The apparatus of claim 15, wherein said control cam controls vertical movement of said first engaging element relative to said dividing segment.

18. The apparatus of claim 15, wherein said control cam comprises a leading control-surface, a central control-surface, and a trailing control-surface, and wherein said central control-surface has a first length and a second length, wherein said first and second lengths are different.

19. The apparatus of claim 15, wherein said linear transporter comprises an electromagnetic direct drive, and wherein said movement elements are controlled independently of each other while circulating on said linear transporter.

20. The apparatus of claim 15, wherein said control cam comprises a leading control-surface, a central control-surface, and a trailing control-surface, wherein, in operation, said first dividing element encounters said leading control-surface before said central control-surface, wherein said leading control-surface defines a slope that causes said first engaging element to move toward said transport plane, wherein said central control-surface extends parallel to said transport plane, as a result of which said central control-surface causes said first engaging element to maintain a vertical position thereof, and wherein said trailing control-surface defines a slope that causes said first engaging element to move away from said transport plane.

* * * * *